Nov. 22, 1960  W. J. STANTON  2,961,026
TIRE ANTISKID DEVICE
Filed March 31, 1958
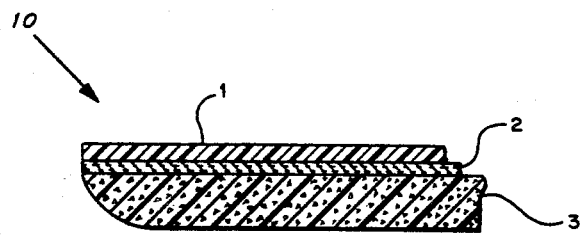
Fig. 2
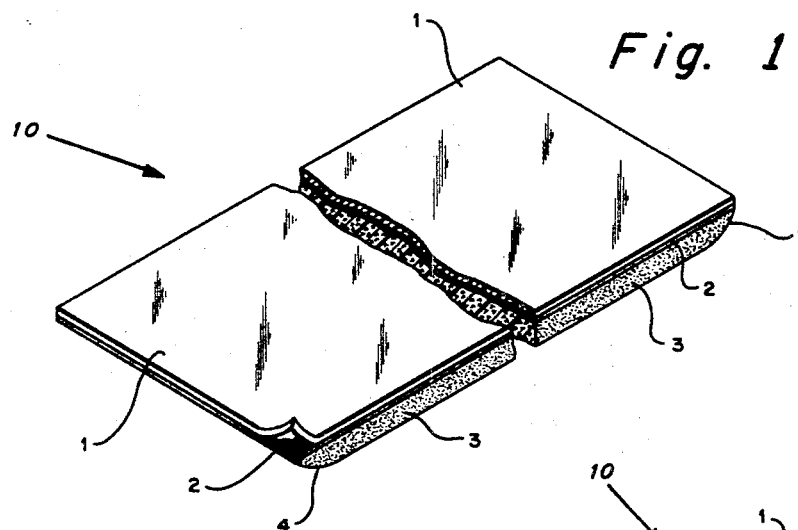
Fig. 1
Fig. 3
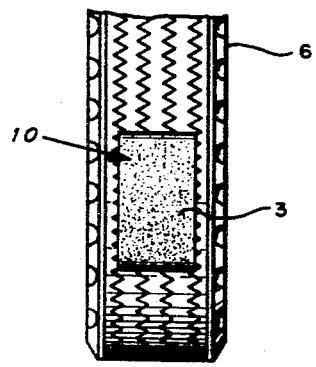
Fig. 4
*INVENTOR.*
WILLARD J. STANTON
BY *Paul Maleson*
ATTORNEY

United States Patent Office 2,961,026
Patented Nov. 22, 1960

2,961,026

TIRE ANTISKID DEVICE

Willard J. Stanton, 1833 Bridge St., New Cumberland, Pa.

Filed Mar. 31, 1958, Ser. No. 725,038

1 Claim. (Cl. 152—211)

This invention relates to an antiskid device for attachment to road tires. More particularly it relates to a temporary antiskid patch adapted for attachment to automotive vehicle tires as a temporary measure.

The problem of preventing or minimizing the skidding of automotive road vehicles on wet, icy or snow covered roads is a serious one. A great variety of means have been proposed and practiced to alleviate this problem, as is well known in the art. The best known of such means is, of course, the tire chains, either of the full chain or snap-on type. These devices, while valuable, have many disadvantages. Chains are bulky and inconvenient to transport; they must be installed on tires when needed, usually under adverse weather conditions. This installation is very difficult and often cannot be successfully performed by the individual automobile driver. Furthermore, chains frequently break under prolonged usage, especially over stretches of road not covered with snow. Still further, metallic chains have limited utility on icy surfaces.

Another well known expedient is the use of so called "snow tires." These tires, by virtue of their tread design, have better road gripping characteristics on slippery surfaces than new ordinary automotive tires. As is known, snow tires, while helpful, are inferior in road gripping ability to chains under many surface conditions. Furthermore, such tires are relatively expensive and in addition their effective life is generally less than that of ordinary road tires. In the vast majority of cases, the road gripping abilities of the snow tire are needed only during a small percentage of total driving time, so that the special structure of these tires is wasted during most of the life of the tire. Various elaborations of special gripping tires have been proposed, such as the embedding of metal or other studs in the tire surface.

Other disadvantages of presently known antiskid devices for road tires are generally well known and need not be further discussed herein. The purpose of this invention is to provide means whereby certain advantages of the known antiskid devices may be obtained, and in some aspects surpassed, at a much lower cost and with less difficulty.

The term "tire" as used herein is to be construed broadly to include all types of natural or artificial rubber road bearing tires, whether on automotive vehicles or not. The term includes, but is not limited to tires on automobiles, trucks, trailers, farm and road machinery, and airplanes for example.

It is an object of this invention to provide a tire attachment to increase the road gripping capabilities of the said tire.

It is another object of this invention to provide a patch comprising rubber or plastic and adapted to adhere to the road bearing surface of a tire.

A still further object of this invention is to provide a tire patch comprising a relatively high-friction surface comprising plastic or rubber and abrasive material and an adhesive backing whereby the said patch may be easily attached to the road bearing surface of a tire.

Other objects and aims of this invention will be made apparent in the following specification.

The invention is best understood in connection with the accompanying drawing in which like numerals refer to like parts and in which:

Figure 1 is a fragmented perspective view of the tire skid patch.

Figure 2 is a cross-sectional elevation view through the tire skid patch, taken along the long axis of the patch.

Figure 3 is a cross-sectional elevational view, taken along the long axis of a modified form of the tire skid patch.

Figure 4 is a front view of a road tire showing the tire skid patch in operative position.

An important aspect of this invention lies in the provision of an adhesive-backed high-friction patch which may be easily carried in an automotive vehicle and attached to the road bearing surface of a tire when necessary. It is a fairly common occurrence to find a road suddenly coated with a thin sheet of ice, sleet, or compacted snow. In such a situation, it is advantageous to be able to easily and rapidly equip tires with devices to increase their frictional interaction with the road surface. It often happens that roads will ice up during the night and that this icy condition will last until the sun's heat melts it during the morning hours. Thus, driving conditions are hazardous for only a relatively short time in the morning. It is advantageous to provide an antiskid device that may be attached to a tire, even though the effective life of the device is short.

Another problem which is conveniently solved by this invention arises when a vehicle loses traction because of a slippery road surface only at one pasticular point, such as the upgrade of a hill, or an isolated patch of snowy or icy road such as exists near a curb. In each of these cases, the vehicle requires extra traction only for a moment so that it may reach the good road surface. When traffic has been moving on a road or highway for some time, a thin fall of snow or layer of ice or icy like material will be cleared off so that automobiles with ordinary tires may safely move thereon. However, the shoulders or curblines of these roads remain in their snowy or icy condition much longer and the entire difficulty in driving a vehicle may lie in operating it from its parked position on the shoulder or along the curb into the main section of the roadway. Extra traction need to be provided only for a few turns of the wheel in such a case.

Another situation wherein extra traction is valuable even though only available for a relatively short time arises where a vehicle must be driven from a driveway or secondary road to a main artery. Typically, the distance traveled on such driveways or feeder roads is short compared to the distance traveled on the main highway. Thus it is seen that a short lived traction apparatus has a great deal of practical application and value.

In Figure 1, the tire skid patch of this invention is shown in a fragmented perspective view. A section is broken out of the middle of the illustrated patch to indicate that typically this patch would be somewhat longer in relation to its width than is illustrated. However, these size relationships are not considered critical. A rubber or plastic sheet 3 is provided. This sheet consists essentially of a plastic or rubber binder impregnated with an anti-friction material. A great variety of well known plastics and natural or synthetic rubbers are suitable for this purpose. For example, the sheet 3 may be nylon, rayon, polyvinyl chloride, Teflon, polyethylene or other plastics. Usable plastics should be of the type known as "rubbery" rather than the types known as "resinous." That is, the plastic material should be flexible rather than stiff and brittle.

The plastic body of the sheet is impregnated with one or more of a great many known anti-friction materials. Such materials include, but are not restricted to sand, grit, mica, metal chips, resin chips, glass, asbestos, and other materials.

The additional structure of the tire skid patch 10 is shown both in Figures 1 and 2. On one side of the plastic sheet 3 a layer of adhesive 2 is provided. On top of this adhesive layer is provided a protective cover 1. This protective cover, adapted to protect and preserve the adhesive layer 2 until it is needed may be made of paper, cloth, or other sheet material as is well known. In the figures, the thicknesses of the various components of the patch 10 are exaggerated for ease of illustration. In practice, the preferred thickness of the abrasive sheet 3 is 1/8". It has been found that this is a highly satisfactory dimension, though it is understood that the thickness may vary from this dimension without departing from the spirit of the invention. A length of about 12" has been found preferable for the skid patch 10. The patch may be as wide as the entire road bearing surface of the tire. In Figure 4, the skid patch 10 is shown in operative position on a road tire 6. The abrasive sheet 3 is outward so that it will bear against the road when the tire 6 rotates. It is noted that the skid patch 10 is not quite the full width of the road bearing or tread surface of the tire 6 as shown in Figure 4. By providing standard width patches 10, they can be easily applied to a tire with a relatively wide tread area 6 or to tires with a relatively narrow tread area. The dimensions of the patch are not considered critical, though it is preferable to provide the patch as nearly as wide as the road bearing surface of the tire as possible.

The adhesive 2 is preferably of the type that may be applied to one surface of the abrasive sheet 3 and then protected until needed by protective cover 1. When it is desired to apply the patch 10 to the tire 6, the protective cover 1 is peeled off, thus exposing the adhesive layer 2. In Figure 1, the start of the peeling operation is illustrated at the lower left hand corner of the patch. Many adhesives are known to the art as satisfactory for the purpose of bonding rubber to rubber or plastic to rubber. Such suitable adhesives would of course be of the pressure sensitive variety rather than the heat sensitive types. It is desirable of course to obtain the strongest possible bonding action, particularly under conditions where the tire is likely to be not completely clean or dry. Ranges of adhesives having neoprene rubber bases reinforced wtih phenolic resin are manufactured by Swift & Co. Lines of synthetic rubber compounds having suitable characteristics are manufactured by Minnesota Mining & Manufacturing Co. A very strong adhesive manufactured by this company is a synthetic rubber based compound sold under the trade name designation of EC–1368.

A new adhesive of remarkably good bonding qualities suitable for bonding polyethylene to neoprene, natural rubber or GR–S synthetic rubber has been developed by Bell Telephone Laboratories. This material comprises partly hydrogenated polybutadiene, sold under the trade name of Hydropol by Phillips Petroleum Co. The polybutadiene has a degree of unsaturation between 3% and 30% preferably. Materials are added to the Hydropol to permit vulcanization. Peel strengths up to 100 p.s.i. and tensile strengths of 1000 p.s.i. have been achieved.

The naming of several adhesives is not to be considered limiting, but only illustrative. Adhesives having many combinations or properties are well known in the art and may be selected for the particular application, depending on conditions of use and the particular materials to be bonded.

The edges 4 of the abrasive sheet 3 which will strike the roadway when the patch is in operative position are rounded as shown. After the protective cover 1 is stripped away, the tire patch 10 is applied to the tire 6 as shown in Figure 4, with the abrasive sheet 3 outward and the adhesive layer 2 inward against the tire surface. The provision of rounded edges 4 tend to prevent the shock of the patch striking the roadway from dislocating or peeling off the patch 10 from the tire 6. Even when a relatively thick sheet 3 is provided, the rounded edges prevent the road from exerting any leverage against the sheet to strip it from the tire.

In operation, as the tire 6 rotates, the abrasive sheet 3 comes into contact with the road. The plastic or rubber binder in the abrasive sheet 3 will tend to wear down rapidly leaving the abrasive particles exposed and protruding outwardly so as to provide a good gripping surface. In ordinary use, the tire patch 10 will remain effective for only a relatively short time, usually less than 10 minutes. The useable time will obviously vary widely depending on conditions.

In Figure 3 a modified form of the invention is shown. This is a cross-sectional view taken along the long axis of a modified form of tire patch 10. Lugs 5 are provided in the abrasive sheet 3. These lugs are arranged so as to be perpendicular to the line of travel of the vehicle when the patch is in operative position. For use on certain types of roads, such as those having some loose snow thereon, the lugs 5 increase the tractive effect of the tire against the road. The lugs will obviously wear off or be destroyed very soon, but their momentary effect in aiding the vehicle to free itself from loose snow is a valuable contribution to the operation of the vehicle. As has been described above, this momentary action is often all that is needed. The modified patch in Figure 3 is shown as relatively short in its long axis to indicate the variety of shapes that the skid patch 10 may take.

A plurality of layers of adhesive, each adhesive layer being adapted to different bonding conditions, may be provided. For example, a layer of adhesive best adapted to bond to a wet surface may be provided contiguous to the abrasive sheet 3, a protective cover 1 be provided on top of the sheet, and a second layer of adhesive best suited to adhere to a dry surface may be provided on top of cover 1. A second cover is provided on top of the second adhesive layer to protect it. In use, the cover or covers are peeled off to expose the desired layer of adhesive.

The shape of the patch, while varying widely within the scope of the invention, is generally rectilinear. The size may vary as has been described. The thickness of the abrasive sheet is preferably about 1/8" for road tire use, though sheets as thin as about 1/32" have been used and sheets as thick as about 1/2" may be provided for heavy duty applications, as off-road use. The term "plastic" is intended to include rubbers, as used in describing the body of the abrasive sheet in this patent. The term "abrasive" as used herein refers generally to materials, such as those enumerated by way of illustration above, which have a better gripping action or higher coefficient of friction with icy or slippery roads than does a tire tread.

The embodiments of the invention described and illustrated herein are intended to be illustrative and not limiting. The scope of this invention is to be determined by the appended claim.

I claim:

A tire skid patch for a tire having a treaded road-bearing surface, said patch normally being apart from said tire and being affixable to the tops of the treads of said treaded road bearing surface entirely outside the dimensions of said tire, for a short period of operation of said tire, said patch comprising a rectangular abrasive sheet, a layer of pressure-sensitive high peel strength adhesive on one side of said sheet, a removable protective cover over said layer of adhesive, said sheet having two of its opposed edges rounded, and a plurality of lugs extending from the surface of said sheet on the other side thereof and unitary therewith, said lugs having their long axes approximately parallel to said rounded edges, said sheet and lugs being made of flexible plastic having abrasive material embedded therein, and being adapted to be affixed to said tire with said rounded edges at right angles to the edge of said tire.

References Cited in the file of this patent

UNITED STATES PATENTS

| | | |
|---|---|---|
| 2,084,784 | Stahl | June 22, 1937 |
| 2,143,523 | Poe | Jan. 10, 1939 |
| 2,547,487 | Penney | Apr. 3, 1951 |
| 2,732,065 | Marchese | Jan. 24, 1956 |

FOREIGN PATENTS

| | | |
|---|---|---|
| 11,399 | Great Britain | 1901 |